United States Patent
Miyamoto et al.

(10) Patent No.: US 10,402,864 B2
(45) Date of Patent: Sep. 3, 2019

(54) DATA PROCESSOR, CONTENT DISTRIBUTION SYSTEM, AND COMMUNICATION APPARATUS

(71) Applicant: TOSHIBA MEMORY CORPORATION, Minato-ku (JP)

(72) Inventors: Arata Miyamoto, Cambridge, MA (US); Kenichi Maeda, Kamakura (JP); Masahiro Ishiyama, Kawasaki (JP); Shinya Murai, Kawasaki (JP); Hiroto Nakai, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 831 days.

(21) Appl. No.: 14/581,054

(22) Filed: Dec. 23, 2014

(65) Prior Publication Data
US 2016/0071158 A1    Mar. 10, 2016

Related U.S. Application Data

(60) Provisional application No. 62/047,921, filed on Sep. 9, 2014.

(51) Int. Cl.
*G06Q 30/00* (2012.01)
*G06Q 30/02* (2012.01)
*G06F 16/9535* (2019.01)

(52) U.S. Cl.
CPC ..... *G06Q 30/0269* (2013.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 2005/0187818 A1* | 8/2005 | Zito | ...... | G06Q 30/02 705/14.52 |
| 2009/0187466 A1* | 7/2009 | Carter | ...... | G06Q 30/02 705/7.34 |
| 2011/0022992 A1* | 1/2011 | Zhou | ...... | G06T 13/205 715/863 |
| 2012/0166261 A1* | 6/2012 | Velusamy | ...... | G06Q 30/0225 705/14.16 |
| 2013/0013595 A1* | 1/2013 | Tseng | ...... | G06F 17/30867 707/723 |
| 2014/0180792 A1* | 6/2014 | Zaheer | ...... | G06O 30/0244 705/14.43 |
| 2015/0039462 A1* | 2/2015 | Shastry | ...... | G06Q 30/0633 705/26.7 |

* cited by examiner

Primary Examiner — Matthew T Sittner
Assistant Examiner — Rodney M Henry
(74) Attorney, Agent, or Firm — Oblon, McClelland, Maier & Neustadt, L.L.P.

(57) ABSTRACT

According to one embodiment, a storage unit, a management unit that acquires attributes of communication apparatuses from a plurality of the communication apparatuses and stores identifiers of the communication apparatuses and the attributes in the storage unit in association with each other as communication apparatus information, and a selection unit that selects a distributor apparatus that is the communication apparatus distributing a content to the other communication apparatuses as a radio signal based on the communication apparatus information are included.

14 Claims, 11 Drawing Sheets

FIG.13

| IDENTIFIER | ATTRIBUTE |
|---|---|
| COMMUNICATION APPARATUS 3-1 | {TAG 200, TAG 201} |
| COMMUNICATION APPARATUS 3-2 | {TAG 202, TAG 203, TAG 204} |
| COMMUNICATION APPARATUS 3-3 | { } |
| ... | ... |
| COMMUNICATION APPARATUS 3-10 | {TAG 202, TAG 204} |
| ... | ... |

FIG.14

| | | |
|---|---|---|
| WEIGHTED TAG | TAG 200 | WEIGHT 300 |
| WEIGHTED TAG | TAG 201 | WEIGHT 301 |
| WEIGHTED TAG | TAG 202 | WEIGHT 302 |

...

| | | |
|---|---|---|
| WEIGHTED TAG | TAG 210 | WEIGHT 310 |

...

| WEIGHTED COORDI-NATE INFORMATION | LATITUDE 700 | LONGITUDE 800 | WEIGHT 900 |
|---|---|---|---|
| WEIGHTED COORDI-NATE INFORMATION | LATITUDE 701 | LONGITUDE 801 | WEIGHT 901 |
| WEIGHTED COORDI-NATE INFORMATION | LATITUDE 702 | LONGITUDE 802 | WEIGHT 902 |
| ... | | | |
| WEIGHTED COORDI-NATE INFORMATION | LATITUDE 710 | LONGITUDE 810 | WEIGHT 910 |
| ... | | | |

FIG.19

| TAG-ATTACHED COORDI-NATE INFORMATION | LATITUDE 700 | LONGITUDE 800 | SUB TAG 530 | SUB TAG 531 | | |
|---|---|---|---|---|---|---|
| TAG-ATTACHED COORDI-NATE INFORMATION | LATITUDE 701 | LONGITUDE 801 | SUB TAG 540 | SUB TAG 541 | SUB TAG 542 | SUB TAG 543 |
| TAG-ATTACHED COORDI-NATE INFORMATION | LATITUDE 702 | LONGITUDE 802 | SUB TAG 550 | | | |
| ... | | | | | | |
| TAG-ATTACHED COORDI-NATE INFORMATION | LATITUDE 710 | LONGITUDE 810 | SUB TAG 610 | SUB TAG 611 | SUB TAG 612 | |
| ... | | | | | | |

# DATA PROCESSOR, CONTENT DISTRIBUTION SYSTEM, AND COMMUNICATION APPARATUS

This application is based upon and claims the benefit of priority from U.S. Provisional Application No. 62/047,921, filed on Sep. 9, 2014; the entire contents of which are incorporated herein by reference.

FIELD

Embodiments described herein relate generally to a data processor, a content distribution system, and a communication apparatus.

BACKGROUND

In a case where a company (a retail store, a restaurant, or the like) distributes information of an advertisement, a coupon, or the like, the information is frequently distributed as electronic data. A company desires to distribute information of an advertisement, a coupon, or the like relating to a service or product provided by the company to potential customers each having a possibility of using or purchasing the service or product. For example, there is a method in which an advertisement relating to a web site is embedded in the web site. This is based on an expectation that a user visiting a web site including a specific content is interested in a service or a product relating to the content.

BRIEF DESCRIPTION OF THE DRAWINGS

FIG. 13 is a diagram that illustrates an example of the configuration of a database of registration management information according to the third embodiment;

FIG. 14 is a diagram that illustrates the data structure of weighted tags according to a fourth embodiment;

FIG. 19 is a diagram that illustrates an example of the data structure of coordinate information according to an eighth embodiment.

DETAILED DESCRIPTION

According to an embodiment, there is provided a data processor including a storage unit, a management unit that acquires attributes of communication apparatuses from a plurality of the communication apparatuses and stores identifiers of the communication apparatuses and the attributes in the storage unit in association with each other as communication apparatus information, and a selection unit that selects a distributor apparatus that is the communication apparatus distributing a content to the other communication apparatuses as a radio signal based on the communication apparatus information.

Hereinafter, a data processor, a content distribution system, and a communication apparatus according to embodiments will be described with reference to the accompanying drawings. However, the present invention is not limited to these embodiments.

First Embodiment

Figure 1:
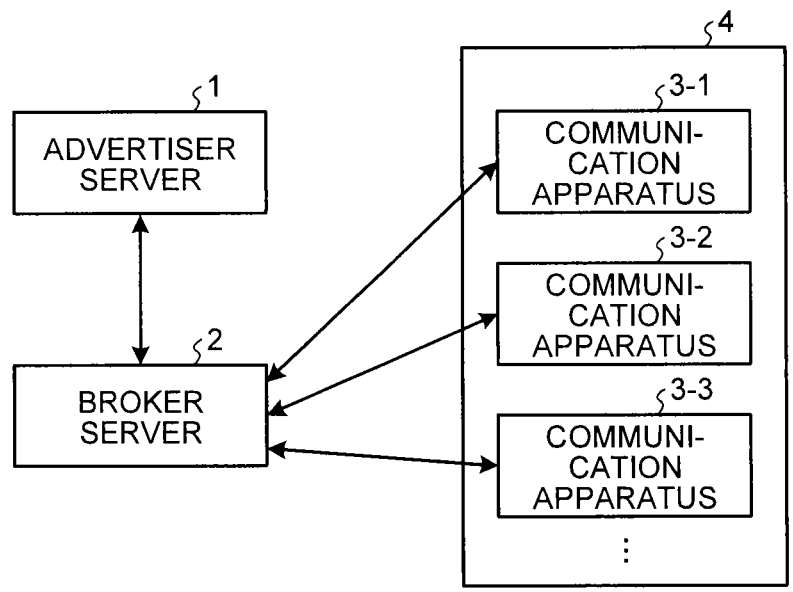
FIG. 1 is a diagram that illustrates an example of the configuration of a content distribution system according to a first embodiment.

FIG. 1 is a diagram that illustrates an example of the configuration of a content distribution system according to a first embodiment. The content distribution system according to this embodiment includes: an advertiser server 1; a broker server 2; and communication apparatuses 3-1 to 3-3. The number of the communication apparatuses 3-1 to 3-3 is not limited to three but is arbitrary.

The advertiser server 1 is a data processor that is installed by a company that is an advertiser. The advertiser is a retail store, a restaurant, or the like and sells products and provides services. The advertiser server 1 generates information of an advertisement, a coupon, and the like relating to the services or the products provided by the company. Hereinafter, the information of an advertisement, a coupon, and the like relating to the services or the products provided by the company will be simply referred to as contents. The communication apparatuses 3-1 to 3-3 are mobile apparatuses that can be carried by persons.

The advertiser desires to distribute contents to potential customers who may use a store of the advertiser. An object of an advertiser's distribution of contents is to urge potential customers to visit the store through the distributed contents and to finally cause those customers to use products or services prepared by the advertiser. A person who is a target for the reception of the contents may see the received contents, be attracted by products or services of the advertiser, and actually visit the store or may not visit the store. In addition, there are many cases where the contents are not seen at all.

A probability that a person who has received a content finally purchases a product or uses a service of an advertiser is called a content hit rate. In order to improve the content hit rate, it is necessary to send a content to a person having a high possibility of being a potential customer. As one index for determining whether a person becomes a potential customer with some degree of certainty, similarity between a service or a product provided by an advertiser and a service or a product the person is interested in may be considered. To persons who are strongly interested in a service of a specific genre, a content such as an advertisement introducing a service of the genre is assumed to be sent. A content hit rate of a case where a content is distributed to persons interested in a specific genre is estimated to be higher than that of a case where a content is distributed to randomly selected persons.

As another index, there is a person's behavior pattern. For example, it is assumed that there is a specific place that persons who are interested in a product or a service of a specific genre frequently visit. In a case where an advertiser wants to distribute a content relating to a product or a service of the genre, it is preferable that persons frequently visiting the specific place are set as targets for the distribution of the content. Meanwhile, in the case of a business having strong locality such as a retail store or a restaurant, there is a low possibility that a person present at a geographically far place visits the retail store or the restaurant. Persons having living spaces near an advertiser such as a person living near the store and a person working near the store have a high possibility of visiting the store. Accordingly, in the case of an advertiser having a business that has a strong area basis, distributing a content to persons frequently visiting the store or the vicinity of the store with high priority is one strategy for improving the content hit rate.

As one of methods for sending a content to persons present near from an advertiser with high priority based on a spatial distance, there is a method using wireless peer-to-peer (P2P) communication. The wireless P2P communication represents a communication form in which data is directly transmitted from a transmission source to a transmission destination not through a base station of a mobile phone operator or a public radio access point. As the communication system, a wireless communication specification such as the institute of electrical and electronics engineers (IEEE) 802.11 is used. A radio signal has a characteristic of being attenuated as the distance increases and arrives at only apparatuses that are present within a predetermined distance from the transmission source. Accordingly, by using the wireless P2P communication, a request for having locality in the arrival range of information can be naturally attained.

As a method for applying wireless P2P communication to a content distribution, for example, there is a method in which an advertiser installs a wireless module to the inside of a store or the vicinity thereof, and a content represented as digital data is transmitted to the surroundings by a radio signal. In such a case, a person who can receive the content has a mobile communication apparatus (mobile apparatus) such as a smartphone with him. Hereinafter, a mobile apparatus that can receive the content will be referred to as a subscriber apparatus. By using such a system configuration, a content can be sent only to a person who has entered an advertiser's store or a person passing the front of the store. In description presented hereinafter, not only an apparatus that actually receives a content but also an apparatus that can receive the content will be referred to as a subscriber apparatus. In addition, a person having the subscriber apparatus with him will be referred to as a subscriber.

As a method for locally distributing a content, there is also a method using a global positioning system (GPS). According to the method, based on a result of positioning performed by a GPS, a wireless module installed by an advertiser transmits a content to a subscriber in a case where a distance between the advertiser and the subscriber is shorter than a predetermined value. However, an error of at least 10 m is included in the result of the positioning performed by the GPS, and there is a disadvantage that the GPS cannot be used at an indoor site or an underground site. In contrast to this, the P2P communication can be used also at an indoor site or an underground site. In addition, by narrowing down the intensity of an output radio signal, the signal arrival distance can be limited to about several meters. In other words, this means that the proximity can be determined with precision of units of several meters.

On the other hand, in the method using the wireless P2P communication, it is necessary for the advertiser to prepare the wireless module used for transmitting a content at his cost. The cost used for the purchase, the installation, and the maintenance/management of the wireless module is a big burden, especially, for a small company. In addition, in a case where a distribution of an advertisement or the like is desired only during a limited period in accordance with a specific event or a specific campaign, the wireless module is prepared for the use during the limited period. In addition, a wireless module that is fixedly set in a store can distribute a content only to subscribers passing near the store. Thus, in a case where a content is desired to be distributed to subscribers present near a plurality of specific places, a plurality of wireless modules are installed, whereby the advertiser's burden increases.

In order to reduce such a problem of an advertiser, in this embodiment, a system is proposed in which some of subscribers are selected as "advertising towers" (hereinafter, referred to as distributors). The advertiser hands over a content desired to be distributed to the subscribers selected as the advertising towers. More specifically, an advertiser or a broker to be described later who has received a request from the advertiser selects some of subscriber apparatuses as apparatuses (hereinafter, referred to as distributor apparatuses) of the "advertising towers". A digital content desired to be distributed by the advertiser is transmitted to the distributors through an Internet line or the like. Then, the distributor apparatus transmits the received content to mobile apparatuses of subscribers who pass by or are present nearby in a building or pass the inside of the building. In such a case, the distributor apparatus achieves the role of spreading the contents to the subscribers instead of the wireless module that is prepared by the advertiser at his cost. Since the advertiser does not need to install the wireless module used for spreading the content, the introduction cost can be reduced as that much.

In addition, an additional advantage of using the distributor is that the distributor can freely move. Accordingly, a content can be transmitted over a wide range that cannot be covered by a small number of wireless modules such as a large facility including a shopping mall or a predetermined district of a street. Furthermore, the distributor has independence and can move at his will, and it is considered that there is an advantage of improving the content hit rate.

More specifically, a prediction that the advantage of improving the content hit rate increases is based on a prediction that persons of close hobbies and tastes tend to be spatially close to each other. For example, there is a high possibility that a person interested in a specific product or service has a person interested in the same product or service or a product or service similar to the specific product or service as his friend. In addition, interest in a specific product or service may depend on the characteristics of an organization or a group to which a person belongs. In such a case, many persons interested in the same product or service or products or services similar to each other highly tend to be simultaneously in contact with one another on a daily basis.

For example, it is considered that a person interested in home electric appliances has a high possibility of having a friend who is also interested in the home electric appliances. In addition, it is considered that this person has many chances of visiting electronics retail stores and conferences relating to home electric appliances. Furthermore, there is a possibility that the person works at a company manufacturing and designing home electric appliances. Thus, it can be estimated that this person frequently visits places at which persons interested in home electric appliances gather together on a daily basis. In a case where a certain company or store wants to distribute a content relating to home electric appliances, this person interested in the home electric appliances may be selected as a distributor. There is a high possibility that this person frequently passes by a person interested in the same product field or stays with the person in the same space. Thus, in a case where a content is distributed from a mobile apparatus held by this person to a mobile apparatus of a person present nearby through the wireless P2P communication, there is a high possibility that the content reaches a person interested in the content.

Based on such a consideration, in order to distribute a content to persons who are interested in the content as much as possible, it is effective to select a person interested in a content represented by the content as a distributor. In this way, the content hit rate can be improved. The distributor selected as above contacts persons interested in the same thing and distributes the content to mobile apparatuses held by the persons. Then, there is a high possibility that a friend or a known person who has received the content is strongly interested in information included in the content. In the example described above, in the vicinity of the distributor interested in the home electric appliances, many subscribers interested in the home electric appliances are present. Accordingly, it can be expected that the number of chances for the subscriber who has received sales information of a home electric appliance product or the like through the distributor to actually purchase a product from the advertiser, in other words, an electronics retail store or the like that is a distribution source of the sale information increases.

Meanwhile it is considered that, there are many persons among the subscribers who deny being distributors. The reason for this is that, in a case where a person becomes a distributor, a mobile apparatus held by the person needs to transmit a content to surrounding subscribers. This increases the consumption amount of a battery of the mobile apparatus carried by the distributor, and a time until the battery is used up is shortened. In addition, as will be described later, since information relating to the subscribers is provided for selecting a distributor, a subscriber giving consent to the collection of the information needs to be found out. Since the role of the distributor is an altruistic behavior of distributing a content desired to be distributed by an advertiser as an agent, it is important for the advertiser how to find out subscribers having such altruistic thoughts. It may be also considered that the advertiser provides some benefits to subscribers allowing themselves to be distributors.

In addition, as described above, by selecting a person having a hobby or taste relating to the subject of a content as a distributor as much as possible, the content hit rate is improved. For that reason, it is necessary for the advertiser not to select any one as a distributor but to select an optimal distributor based on the characteristics of a content desired to be distributed.

However, the role of finding out subscribers allowing themselves to be distributors or selecting a subscriber suitable for a distributor is a burden for an advertiser. Particularly, in a case where the advertiser is a business owner of a small company, it is not practical for the advertiser to find out optimal distributors among a huge number of potential customers.

Thus, according to the content distribution system of this embodiment, a role model named a broker who relays between an advertiser and a subscriber is defined. The broker installs the broker server 2 illustrated in FIG. 1. The broker server 2 manages a list of users having mobile apparatuses, in other words, subscribers. In addition, the broker server 2 also maintains information relating to hobbies and tastes of each subscriber. In a case where a subscriber allows him to be a distributor, the subscriber registers his identification in the broker server by operating the subscriber apparatus. A subscriber who is registered as above will be referred to as a registered subscriber. A mobile apparatus (communication apparatus) held by a registered subscriber will be referred to as a registered communication apparatus.

Meanwhile the advertiser installs the advertiser server 1. The advertiser server 1 generates digital data of a content desired to be distributed by the advertiser. In addition, in a case where the advertiser wants to find a distributor, by operating the advertiser server 1, the advertiser requests the broker server 2 to search for a distributor. A consignment contract between the advertiser and the broker may be electronically made or may be made using a document or the like between the advertiser server 1 and the broker server 2. When the consignment contract between the advertiser and the broker is made, the advertiser server 1 instructs the broker server 2 for conditions for searching for a distributor. The broker server 2 selects a distributor from among registered communication apparatuses based on the instructed conditions. In the configuration example illustrated in FIG. 1, the communication apparatuses 3-1 to 3-3 are the registered communication apparatuses 4. A method for selecting a distributor will be described later.

In addition, the advertiser server 1 transmits a content that is digital data to the broker server 2. Here, while an example in which the content is transmitted to the broker server 2 through a communication line such as the Internet line is illustrated, it may be configured such that the advertiser delivers a content to the broker through a medium (a digital versatile disc (DVD) or the like) other than a communication medium, and the broker server 2 reads the content.

When a distributor is selected, the broker server 2 delivers the content to the distributor. In a method of delivering a content from the broker server 2 to the distributor, a communication line such as an Internet line may be used, or a medium other than a communication medium may be used. The distributor transmits the content received from the broker server 2 to another subscriber apparatus through the wireless P2P communication.

Figure 2:
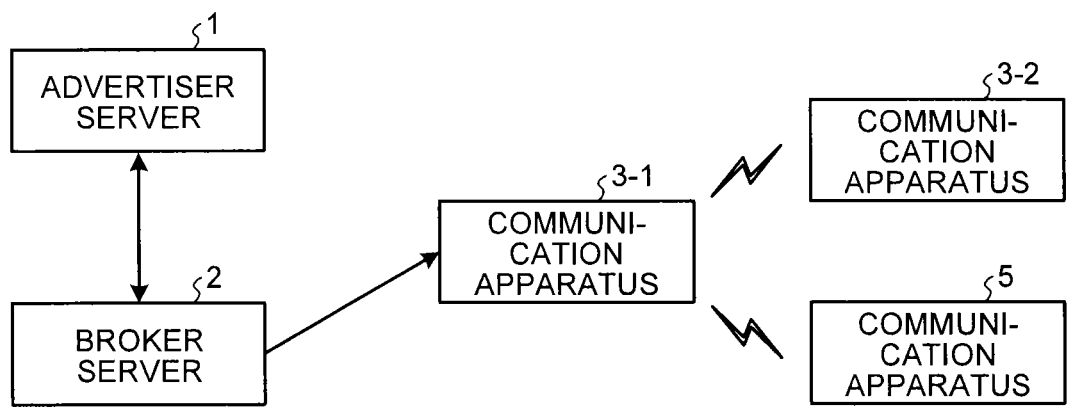
FIG. 2 is a diagram that illustrates an example of a content distribution performed by a distributor apparatus.

FIG. 2 is a diagram that illustrates an example of the content distribution performed by the distributor apparatus. FIG. 2 illustrates an example in which the communication apparatus 3-1 is selected as a distributor apparatus. The communication apparatus 3-1 receives a content from the broker server 2 and transmits the received content to the communication apparatus 3-2 and a communication apparatus 5 located within a wireless communication zone. While the communication apparatus 3-2 is a registered communication apparatus 4, the communication apparatus 5 is a subscriber apparatus but is not a registered communication apparatus 4. In this way, the distributor apparatus can distribute the content to the subscriber apparatus. The distributor apparatus moves in accordance with the movement of the distributor and distributes a content to the subscriber apparatuses located within a wireless communication zone in a movement destination as well.

Figure 3:
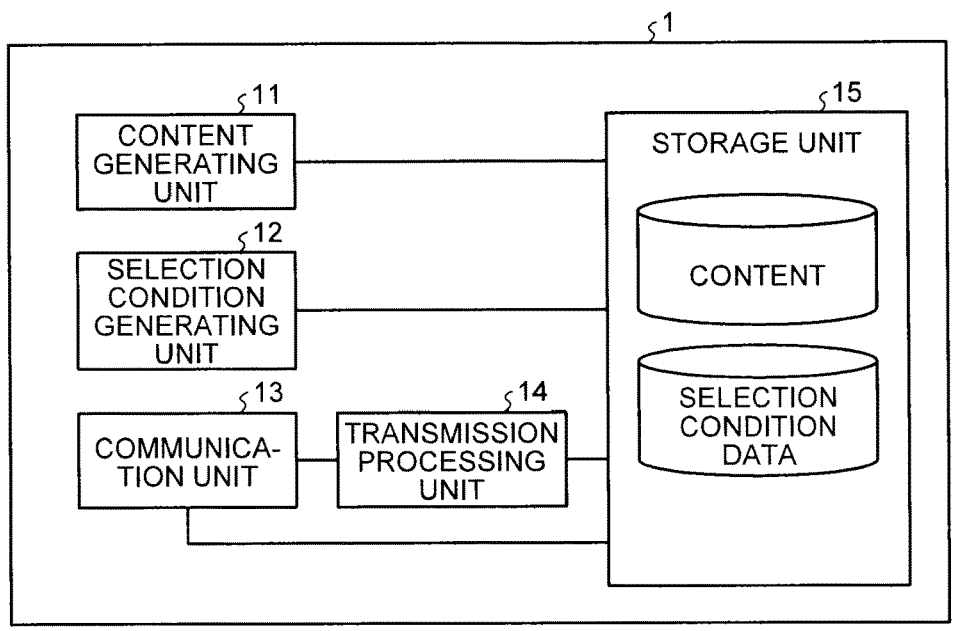
FIG. 3 is a diagram that illustrates an example of the configuration of an advertiser server.

FIG. 3 is a diagram that illustrates an example of the configuration of the advertiser server 1. As illustrated in FIG. 3, the advertiser server 1 includes: a content generating unit 11; a selection condition generating unit 12; a communication unit 13; a transmission processing unit 14; and a storage unit 15. The content generating unit 11 generates a content as digital data. The selection condition generating unit 12 generates a condition for selecting a distributor and stores the generated condition in the storage unit 15 as selection condition data. The communication unit 13 performs a process that is compliant with a communication protocol and the like. The transmission processing unit 14 transmits the selection condition data and the content to the broker server 2 through the communication unit 13. In addition, the transmission processing unit 14 transmits the content to the communication apparatuses selected as distributor apparatuses. The storage unit 15 stores the content and the selection condition data.

Figure 4:
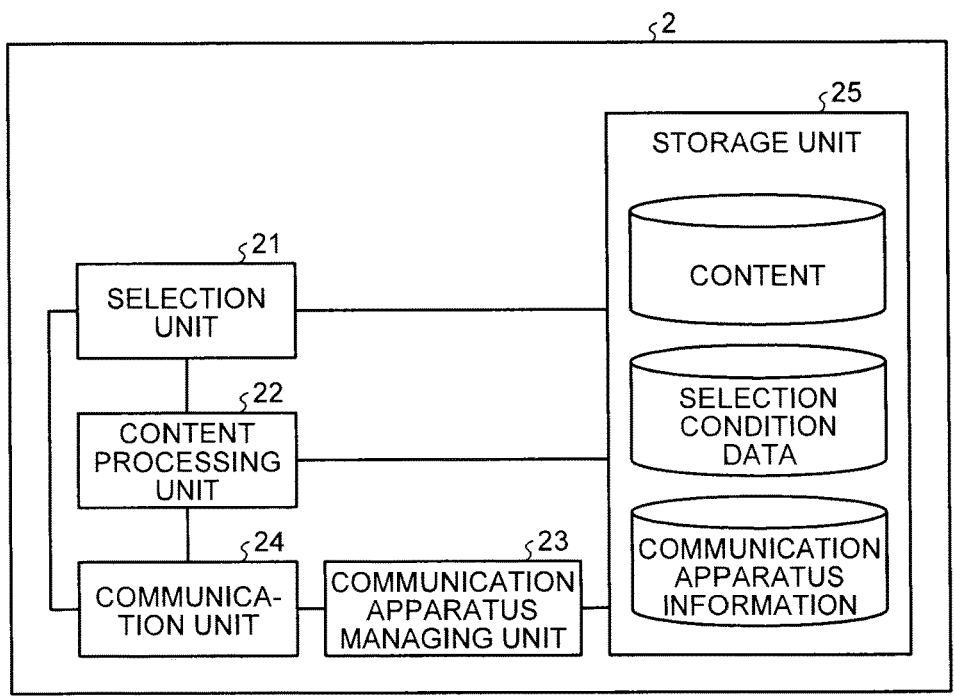
FIG. 4 is a diagram that illustrates an example of the configuration of a broker server.

FIG. 4 is a diagram that illustrates an example of the configuration of the broker server 2. As illustrated in FIG. 4, the broker server 2 includes: a selection unit 21; a content processing unit 22; a communication apparatus managing unit 23 (management unit); a communication unit 24; and a storage unit 25. The communication unit 24 performs a process that is compliant with a communication protocol and the like. The content processing unit 22 stores the selection condition data and the content received from the advertiser server 1 in the storage unit 25.

When a registration request is received from the communication apparatus through the communication unit 24, the communication apparatus managing unit 23 registers the communication apparatus. In this way, the communication apparatus that is a transmission source of the registration request becomes a registered communication apparatus. More specifically, the communication apparatus managing unit 23 adds an entry of the communication apparatus that is the transmission source of the registration request to communication apparatus information stored in the storage unit 25. In addition, when predetermined information is received from the registered communication apparatus through the communication unit 24, the communication apparatus managing unit 23 stores the received information in an entry corresponding to the apparatus that is the transmission source included in the communication apparatus information. The selection unit 21 selects the distributor apparatus based on the selection condition data and the communication apparatus information stored in the storage unit 25.

In addition, the broker may receive consignments from a plurality of advertisers and select distributors based on a selection condition different for each advertiser. In such a case, the broker server 2 maintains the selection condition data for each advertiser, selects a distributor corresponding to each advertiser, and transmits the content to the selected distributors. Furthermore, by making a registration request for allowing each subscriber to be a distributor for each advertiser, the communication apparatus information may be configured to be maintained for each advertiser. In addition, the registration request may be received without the advertisers being discriminated from each other, and the communication apparatus information may be configured to be common.

Figure 5:
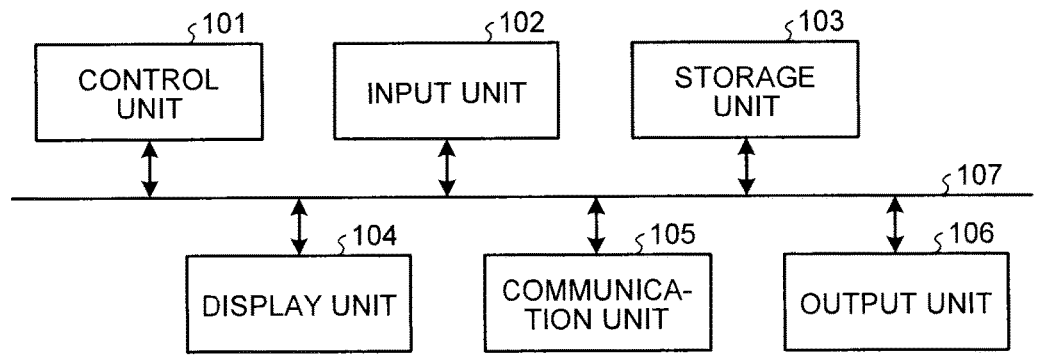
FIG. 5 is a diagram that illustrates an example of the configuration of a computing system.

More specifically, each of the advertiser server 1 and the broker server 2 is a computing system (computer), in other words, a data processor. By executing a program for an advertiser server or a broker server on this computing system, the computing system serves as the advertiser server 1 or the broker server 2. FIG. 5 is a diagram that illustrates an example of the configuration of the computing system according to this embodiment. As illustrated in FIG. 5, the computing system includes: a control unit 101; an input unit 102; a storage unit 103; a display unit 104; a communication unit 105; and an output unit 106, and these units are interconnected through a system bus 107.

In FIG. 5, the control unit 101, for example, is a central processing unit (CPU) or the like and executes the program for the advertiser server or the broker server according to this embodiment. The input unit 102, for example, is configured by a keyboard, a mouse, or the like and is used by a user using the computing system for inputting various kinds of information. The storage unit 103 includes various memories such as a random access memory (RAM) and a read only memory (ROM) and a storage device such as a hard disk and stores programs executed by the control unit 101, necessary data acquired during the process, and the like. In addition, the storage unit 103 is used also as a temporary storage area of the programs. The display unit 104 is configured by a liquid crystal display (LCD) or the like and displays various screens for the user using the computing system. Here, FIG. 5 is an example, and thus the configuration of the computing system is not limited to the example illustrated in FIG. 5. For example, a configuration not including the output unit 106 may be employed.

Here, an example of the operation of the computing system until a content distribution program according to this embodiment is in an executable state will be described. In the computing system employing the above-described configuration, for example, the program for the advertiser server or the broker server is installed to the storage unit 103 from a compact disc (CD) ROM/DVD-ROM set in a CD-ROM/DVD-ROM drive (not illustrated in the figure). Then, when the program for the advertiser server or the broker server is executed, the program for the advertiser server or the broker server that is read from the storage unit 103 is stored in a predetermined place of the storage unit 103. In this state, the control unit 101 executes the process of this embodiment in accordance with the program stored in the storage unit 103.

In this embodiment, while the program for the advertiser server or the broker server is provided by using the CD-ROM/DVD-ROM as a recording medium, the embodiment is not limited thereto. Thus, in accordance with the configuration of the computing system, the capacity of the provided program, and the like, for example, a program provided by a communication medium such as the Internet through the communication unit 105 may be configured to be used.

The content generating unit 11, the selection condition generating unit 12, and the transmission processing unit 14 illustrated in FIG. 3 are included in the control unit 101 illustrated in FIG. 5. The storage unit 15 illustrated in FIG. 3 is a part of the storage unit 103 illustrated in FIG. 5. In addition, the communication unit 13 illustrated in FIG. 3 corresponds to the communication unit 105 illustrated in FIG. 5. The selection unit 21, the content processing unit 22, and the communication apparatus managing unit 23 illustrated in FIG. 4 are included in the control unit 101 illustrated in FIG. 5. The storage unit 25 illustrated in FIG. 4 is a part of the storage unit 103 illustrated in FIG. 5. In addition, the communication unit 24 illustrated in FIG. 4 corresponds to the communication unit 105 illustrated in FIG. 5.

Next, the operation of the broker server 2 according to this embodiment will be described. As described above, when a consignment contract for selecting a distributor is made between the broker and the advertiser, the broker server 2 receives the content and the selection condition data from the advertiser server 1. The content processing unit 22 of the broker server 2 stores the content and the selection condition data in the storage unit 25. When the storing of the content and the selection condition data is completed, the broker server 2 starts the registration of communication apparatuses and an information collection process. Here, for the simplification of description, an operation of selecting a distributor distributing a content of one advertiser that is performed by the broker server 2 will be described. In a case where distributors corresponding to a plurality of advertisers are to be selected, the following operation may be performed for each advertiser.

Figure 6:
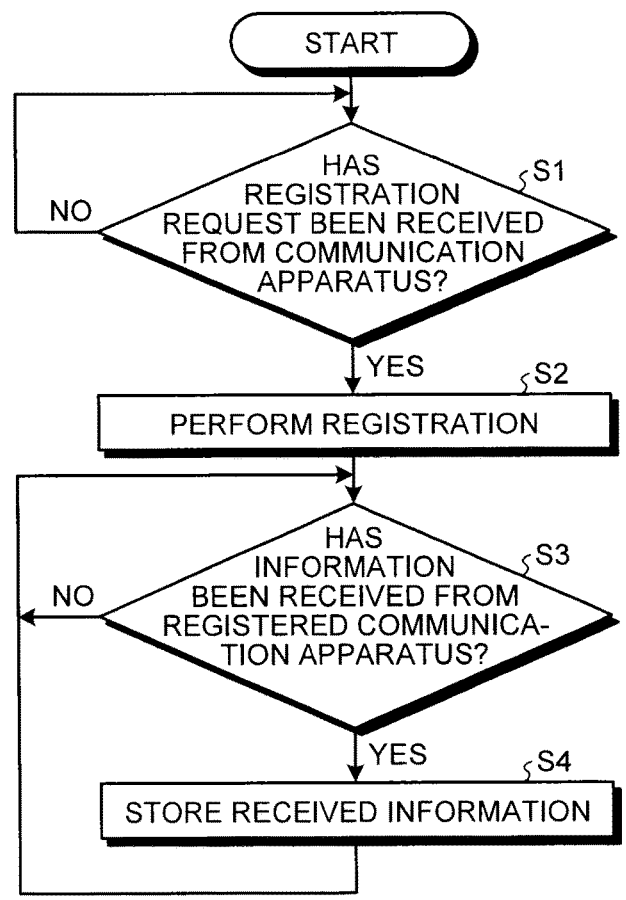
FIG. 6 is a flowchart that illustrates an example of a communication apparatus registration and information collection process.

FIG. 6 is a flowchart that illustrates an example of a communication apparatus registration and information collection process according to this embodiment. When receiving a registration request from a communication apparatus through the communication unit 24 in step S1, the communication apparatus managing unit 23 of the broker server 2 registers the communication apparatus that is the transmission source of the registration request in step S2. More specifically, as described above, an entry corresponding to the communication apparatus that is the transmission source is added to the communication apparatus information stored in the storage unit 25. Then, an identifier of the communication apparatus that is the transmission source is stored in the added entry. The communication apparatus transmitting the registration request is a subscriber apparatus that has not been registered.

The communication apparatus information, for example, may be maintained as a database. As the data structure of the database, for example, a hash table may be used. In such a case, an item matching an item designated as a selection condition can be searched for in a constant order. In other words, even when the number of items registered in the database increases, the search can be made without increasing the processing time.

In addition, there are cases where a subscriber apparatus transits to a distributor apparatus. Thus, here, a case may be also considered in which one subscriber is interested in contents of a plurality of advertisers and transmits registration requests for contents corresponding to the plurality of advertisers. In such a case, a communication apparatus may be a distributor for a content and be a subscriber apparatus for another content.

The communication apparatus managing unit 23 of the broker server 2 determines whether or not information has been received from a registered communication apparatus in step S3. The information described here is information that is used for selecting a distributor apparatus and is information that represents an interest, a taste, or a behavior pattern of a subscriber who owns the communication apparatus.

In a case where the information has been received from a registered communication apparatus (Yes in step S3), the received information is stored in an entry corresponding to the registered communication apparatus among the communication apparatus information in step S4, and the process is returned to step S3. On the other hand, in a case where the information has not been received from a registered communication apparatus (No in step S3), the process of step S3 is repeated. In addition, during the process of step S3 and a step subsequent thereto, every time when a registration request is received from another communication apparatus, the process of step S2 is performed.

Figure 7:
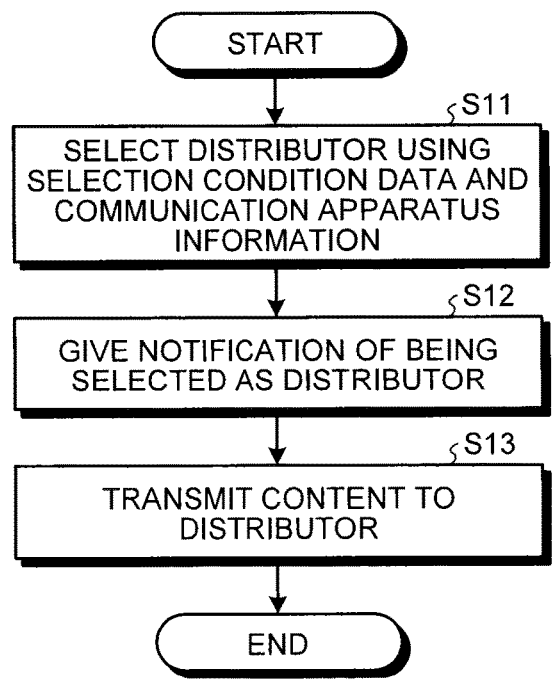
FIG. 7 is a flowchart that illustrates an example of the sequence of a distributor selection process.

FIG. 7 is a flowchart that illustrates an example of the sequence of a distributor selection process. In a case where there are one or more registered communication apparatuses, the broker server 2 performs the distributor selection process. First, the selection unit 21 selects a distributor apparatus by using the selection condition data and the communication apparatus information stored in the storage unit 25 in step S11. In the example illustrated in FIG. 1, a distributor apparatus is selected from among the communication apparatuses 3-1 to 3-3 that are registered communication apparatuses 4. The selection unit 21 notifies the selected distributor apparatus of being selected as the distributor apparatus (consign the communication apparatus to be a distributor apparatus) in step S12. Then, the content processing unit 22 reads the content stored in the storage unit 25 and transmits the read content to the distributor apparatus through the communication unit 24 in step S13.

Here, step S12 may be omitted. In addition, it may be configured such that, after step S12, the process waits for a response from the communication apparatus that has been notified of being selected as a distributor apparatus, and the process proceeds to step S13 in a case where the response is a response allowing the communication apparatus to be a distributor apparatus. On the other hand, in a case where a response not allowing the communication apparatus to be a distributor apparatus is received by the broker server 2, the process of step S13 may not be performed. In addition, in a case where a response not allowing the communication apparatus to be a distributor apparatus is received, the broker server 2 may notify the communication apparatus of being selected as a distributor apparatus again in step S12 after an elapse of a predetermined time and wait for a response.

In addition, it may be configured such that the process (step S11) of selecting a distributor apparatus is repeated at every predetermined period, and, in a case where a communication apparatus that has been consigned as being a distributor apparatus is not selected as a distributor apparatus in the latest process, a notification (cancellation notification) for canceling the consignment as a distributor may be transmitted to the communication apparatus. Furthermore, a cancellation notification may be configured to be transmitted when a predetermined time elapses after the consignment for being a distributor apparatus is made.

The selection condition data used for selecting a distributor is information that designates an interest, a taste, or a behavior pattern. The interest is classified into a plurality of genres, and identification information representing each classified genre is defined. Then, in the information received in step S3, the identification information representing the genre of an interest is included. The subscriber inputs identification information corresponding to a genre in which the subscriber is interested by operating the communication apparatus owned by the subscriber. Alternatively, instead of subscriber's explicit input, it may be configured such that the communication apparatus acquires a genre to which many accesses are made by analyzing web pages referred to by the subscriber and transmits identification information corresponding to the acquired genre to the broker server 2. In addition, it may be configured such that a communication apparatus owned by a subscriber transmits information such as web pages referred to by the subscriber to the distributor apparatus, and the distributor apparatus analyzes the interest and the taste of each subscriber. In such a case, the distributor apparatus acquires identification information corresponding to a genre in which each subscriber is interested by analyzing the interest and the taste of the subscriber and transmits the acquired identification information to the broker server 2.

In addition, in the selection condition data, the number of distributor apparatuses may be included. Furthermore, in the selection condition data, a list of identifiers of communication apparatuses that are desired by the advertiser to be candidates for a distributor apparatus may be included. There are cases where the advertiser in advance acquires information of users having a high possibility of being interested in a content to be distributed such as users using services provided by the advertiser or registrants of services provided on a web page. In such cases, the advertiser may designate identifiers of communication apparatuses corresponding to such users as the selection condition data in the broker server 2.

Figure 8:
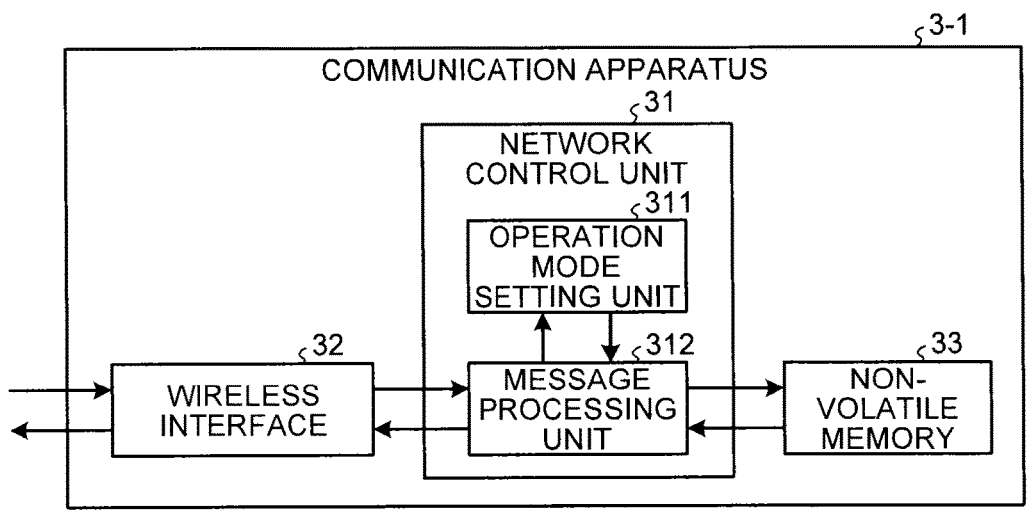
FIG. 8 is a diagram that illustrates an example of the configuration of a communication apparatus.

FIG. 8 is a diagram that illustrates an example of the configuration of the communication apparatus 3-1 according to this embodiment. In the example of the configuration illustrated in FIG. 1, the communication apparatuses 3-2 and 3-3 that are registered communication apparatuses have a configuration that is similar to that of the communication apparatus 3-1. The operation of each of the communication apparatuses 3-2 and 3-3 is similar to that of the communication apparatus 3-1. A subscriber apparatus (the communication apparatus 5 illustrated in FIG. 2) other than the registered communication apparatuses may have the configuration illustrated in FIG. 8 or a configuration that does not have the function of the distributor apparatus.

As illustrated in FIG. 8, the communication apparatus 3-1 includes: a network control unit 31; a wireless interface 32; and a non-volatile memory 33. The wireless interface 32 performs a process of receiving a radio signal for realizing the wireless P2P communication. In a case where the received signal is a message addressed to the apparatus, the wireless interface 32 outputs the message to the network control unit 31. In addition, the wireless interface 32 transmits a message generated by the network control unit 31 as a radio signal. There is no restriction on the protocol and the like for realizing the wireless P2P communication, and, for example, an Internet protocol (IP) may be used. The non-volatile memory 33 stores data to be transmitted, received data, and the like.

The network control unit 31 includes an operation mode setting unit 311 and a message processing unit 312. The operation mode setting unit 311 (operation mode storing unit) sets the apparatus (the communication apparatus 3-1) to be operated in a mode (operation mode) of either a distributor apparatus or a subscriber apparatus. The operation mode may be set for each of contents of which the advertisers are different from each other (in other words, for each advertiser). For example, one communication apparatus may be set to be a distributor apparatus distributing contents generated by an advertiser and a subscriber apparatus receiving contents generated by the other advertisers. In addition, one communication apparatus may be selected as a distributor apparatus for a plurality of contents (a plurality of advertisers) and deliver the plurality of contents. The operation mode setting unit 311 instructs the message processing unit 312 on an operation mode for each of contents of which the advertisers are different from each other. In addition, in a case where the communication apparatus operates as a distributor apparatus, the wireless interface 32, in a case where the presence of another communication apparatus on the periphery is detected, notifies the message processing unit 312 of the detection and, in a case where no-presence of another communication apparatus on the periphery is detected, notifies the message processing unit 312 of the detection. The detection of presence/no-presence of another communication apparatus on the periphery, for example, is determined based on whether or not a radio signal of a predetermined level or a higher level is received.

Hereinafter, an operation performed in the content distribution according to this embodiment will be described. However, the communication apparatus 3-1 may have a function for performing an operation other than the operation performed in the content distribution according to this embodiment. For example, the communication apparatus 3-1 may have functions for performing operations such as reading a web page through the Internet, transmission/reception of an electronic mail, reception of video data, and the like other than the content distribution according to this embodiment. Here, the operations other than the operation performed in the content distribution will not be presented.

The message processing unit 312 determines whether a message received through the wireless interface 32 is a control message or a data message. In this embodiment, a message including a content generated by an advertiser will be referred to as a data message, and a message not including a content generated by an advertiser will be referred to as a control message. In a case where the received message is a control message, the message processing unit 312 analyzes the content of the control message. Then, the message processing unit 312 performs a process according to the content and, in a case where a response is necessary, generates a control message in which the response is stored and outputs the generated control message to the wireless interface 32. In each message, the identifier of the communication apparatus 3-1 that is the transmission source is stored.

In addition, in the case where the communication apparatus operates as a subscriber apparatus, the message processing unit 312, in a case where the received message is a data message, stores the content in the non-volatile memory 33 and notifies the subscriber of the subject of the content, for example, by displaying the subject of the content on a display unit not illustrated in the figure or the like.

On the other hand, in a case where the communication apparatus operates as a distributor apparatus, the message processing unit 312 stores the content in the non-volatile memory 33 in a case where the received message is a data message. Then, in a case where the presence of another communication apparatus on the periphery is detected by the wireless interface 32, a data message in which the content is stored is generated and is transmitted through the wireless interface 32 through broadcasting. In addition, in the case where the communication apparatus operates as a distributor apparatus, the message processing unit 312 stops the transmission of the data message in which the content is stored in a case where no-presence of another communication apparatus is detected by the wireless interface 32.

Figure 9:
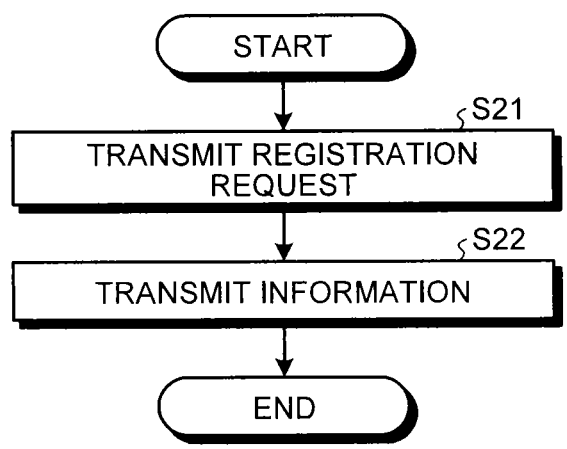
FIG. 9 is a flowchart that illustrates an example of the processing sequence of a registration request in the communication apparatus.
Figure 10:
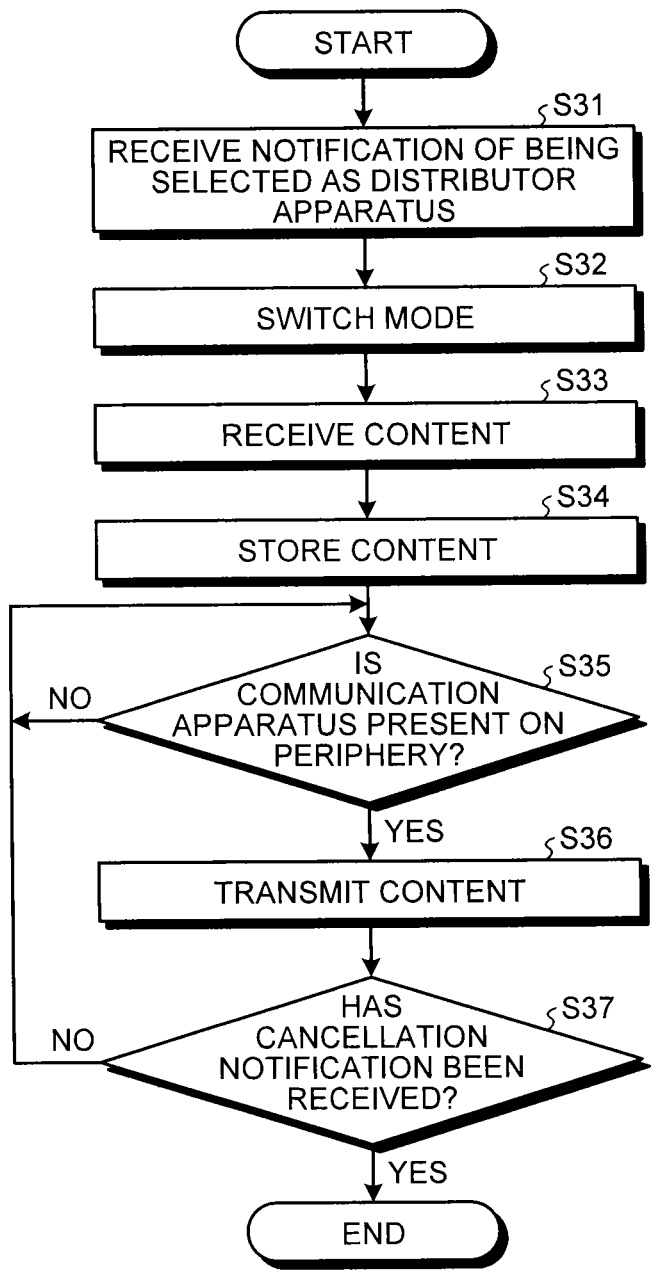
FIG. 10 is a flowchart that illustrates an example of the operation sequence of a case where the communication apparatus 3-1 becomes a distributor apparatus.

FIG. 9 is a diagram that illustrates an example of the processing sequence of a registration request in the communication apparatus 3-1 according to this embodiment. A subscriber having the communication apparatus 3-1, in a case where being a distributor is determined to be allowed, inputs the allowing of being a distributor to the communication apparatus 3-1 by operating an input unit, such as a keyboard or a button not illustrated in the figure, of the communication apparatus 3-1. The message processing unit 312 of the communication apparatus 3-1 generates a control message used for a notification of the registration request in accordance with the input. The message processing unit 312 transmits the control message to the broker server 2 through the wireless interface 32 and a transmission line such as the Internet in step S21. In accordance with the notification of the registration request, the communication apparatus 3-1 becomes a registered communication apparatus. FIG. 10 illustrates a state after the registration request is transmitted by the communication apparatus 3-1.

The method of the notification of the registration request is not limited to that illustrated in this example, and the broker or the advertiser may be notified by the subscriber through a document, a telephone call, or the like. At this time, the subscriber gives a notification of the identifier of the communication apparatus 3-1 as well. In addition, in a case where the advertiser is notified of the registration request, the advertiser notifies the broker of the registration request. The broker sets the content of the registration request in the broker server 2 based on the registration request.

Then, the message processing unit 312 transmits the information to the broker server 2 as a control message through the wireless interface 32 and a transmission line such as the Internet in step S22. This information is the above-described information that is used when a distributor is selected and is information that illustrates the interest or the like of the subscriber. Here, the notification method of the information is not limited to that of this example, and, similarly to the registration request, the notification of the information may be given from the subscriber to the broker or the advertiser through a document, a telephone call, or the like. However, in a case where the information has a possibility of being updated, a form in which information is transmitted from the communication apparatus 3-1 is efficient. In addition, instead of directly transmitting the information from the communication apparatus 3-1, the information may be transmitted through a mobile phone company or the like (hereinafter, referred to as a carrier) providing a wireless environment to the communication apparatus 3-1. In addition, the carrier may be configured to acquire an access history and the like of the communication apparatus 3-1 and transmit the information to the broker server 2 as the information of the communication apparatus 3-1.

FIG. 10 is a flowchart that illustrates an example of the operation sequence of a case where the communication apparatus 3-1 becomes a distributor apparatus. The message processing unit 312 of the communication apparatus 3-1 receives the control message giving a notification of being selected as a distributor apparatus from the broker server 2 in step S31. The message processing unit 312 notifies the operation mode setting unit 311 of being selected as a distributor apparatus. The operation mode setting unit 311 switches the operation mode to the mode of the distributor apparatus in step S32.

The message processing unit 312 of the communication apparatus 3-1 receives the data message in which the content is stored from the broker server 2 through the wireless interface 32 in step S33. The message processing unit 312 stores the content in the non-volatile memory 33 in step S34. Alternatively, as described above, the communication apparatus 3-1 may receive the content from the broker server 2 through a separate transmission line or a medium other than the communication medium.

The message processing unit 312 determines whether or not the message processing unit has been notified of the presence of a communication apparatus on the periphery by the wireless interface 32 in step S35. In a case where the message processing unit is notified of the presence of a communication apparatus on the periphery (Yes in step S35), the message processing unit 312 transmits the content through broadcasting in step S36. More specifically, the message processing unit 312 generates a data message in which the content is stored and transmits the generated data message through the wireless interface 32 through broadcasting.

The message processing unit 312 determines whether or not a control message representing a cancellation notification has been received from the broker server 2 in step S37. In a case where the control message representing the cancellation notification has been received (Yes in step S37), the operation as the distributor apparatus ends, and the operation mode setting unit 311 switches the operation mode to the mode of the subscriber apparatus.

In a case where a notification of the presence of the communication apparatus on the periphery is not made (No in step S35), the message processing unit 312 repeats step S35. In a case where a control message representing the cancellation notification has not been received (No in step S37), the process is returned to step S35.

In the example described above, while the broker server 2 is configured to consign the communication apparatus 3-1 as a distributor apparatus and transmit the content, the advertiser server 1 may be configured to consign the communication apparatus 3-1 as a distributor apparatus and transmit the content. In such a case, when the distributor apparatus is selected, the broker server 2 notifies the advertiser server 1 of a result of the selection.

As above, in this embodiment, a communication apparatus according to the selection condition represented in an instruction from the advertiser is configured to be selected as a distributor from among the registered communication apparatuses that are mobile apparatuses. Then, the distributor apparatus is configured to distribute a content desired to be distributed by the advertiser to the other communication apparatuses present on the periphery through the wireless P2P communication. Since the distributor apparatus is a mobile apparatus that can be freely moved, not only a content to be consigned for the distribution is determined based on the interest of the distributor, but the content to be consigned may be determined based on a movement pattern that is acquired by quantifying a place that the distributor frequently visits or the like. In this way, according to this embodiment, as the distributor distributes a content to another communication apparatus that is close thereto in distance while moving, the burden on the advertiser is reduced, and an advertisement distribution service of a place-associated type can be realized.

In addition, according to this embodiment, the broker server 2 collects information of many communication apparatuses and notifies the advertiser of a result of the selection of the distributor. Accordingly, the owner information of communication apparatuses that is not related to the advertiser is not acquired by the advertiser. Since the broker is a company handling personal information, the broker is naturally required to strictly manage the personal information. However, a company of any one of various scales may be considered as an advertiser, and there is a possibility that there is a difference in the degree of strictness of management of the personal information. In this embodiment, only the broker maintains a large amount of databases, and accordingly, there is an advantage that the strict management can be easily realized.

Second Embodiment

Figures 11, 12:
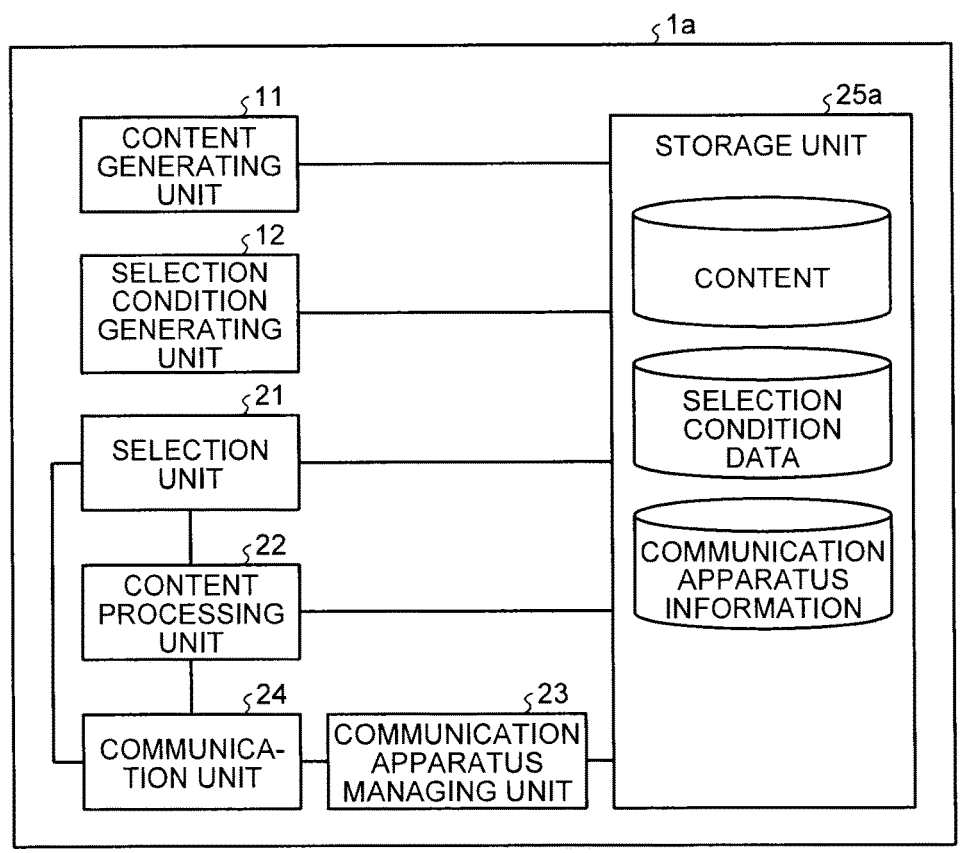
FIG. 11 is a diagram that illustrates an example of the configuration of an advertiser server according to a second embodiment.
FIG. 12 is a diagram that illustrates an example of the configuration of a selection condition according to a third embodiment.

FIG. 11 is a diagram that illustrates an example of the configuration of an advertiser server 1a according to a second embodiment. The advertiser server 1a according to this embodiment has a configuration acquired by integrating the functions of the advertiser server 1 and the broker server 2 according to the first embodiment. A content distribution system according to this embodiment is similar to the content distribution system according to the first embodiment except that the advertiser server 1a is provided instead of the advertiser server 1 and the broker server 2 according to the first embodiment. The same reference numeral as that of the first embodiment is assigned to a constituent element having the same function as that of the first embodiment, and duplicate description thereof will not be presented. Here, points different from the first embodiment will be described.

In a case where the advertiser is a large-scale company, a case may be considered in which it is effective to integrate the functions of the advertiser server and the broker server. In this embodiment, an example will be described in which an apparatus acquired by integrating the functions of the advertiser server and the broker server is used.

As illustrated in FIG. 11, a content generating unit 11, a selection condition generating unit 12, a selection unit 21, a content processing unit 22a, a communication apparatus managing unit 23, a communication unit 24, and a storage unit 25a are provided. More specifically, the advertiser server 1a is also the computing system illustrated in FIG. 5.

The storage unit 25a stores a content, selection condition data, and communication apparatus information. The content, the selection condition data, and the communication apparatus information are similar to those of the first embodiment.

The content generating unit 11 and the selection condition generating unit 12 according to this embodiment are similar to those according to the first embodiment. The content and the selection condition data that have been generated are stored in the storage unit 25a. The selection unit 21 according to this embodiment, similarly to that of the first embodiment, selects a distributor apparatus based on the selection condition data and communication apparatus information stored in the storage unit 25a.

The communication apparatus managing unit 23 is similar to the communication apparatus managing unit 23 according to the first embodiment. The communication apparatus managing unit 23 according to this embodiment stores information received from a communication apparatus as the communication apparatus information stored in the storage unit 25a. The content processing unit 22 is similar to the content processing unit 22 according to the first embodiment. The content processing unit 22 according to this embodiment transmits a content stored in the storage unit 25a to a distributor apparatus through the communication unit 24.

According to this embodiment, the advertiser server 1a not only generates the content and the selection condition data but also performs the distributor selection process performed by the broker server 2 according to the first embodiment. In this way, advantages that are similar to those of the first embodiment can be acquired.

Third Embodiment

Next, a method for selecting a distributor according to a third embodiment will be described. The configuration of a content distribution system according to this embodiment and the configuration of each apparatus configuring the content distribution system are similar to those of the first embodiment or the second embodiment.

Here, a specific example of the method for selecting a distributor of a case where the configuration example according to the first embodiment is employed will be described. However, also in a case where the configuration example according to the second embodiment is employed, while the subject of the selection is replaced with the advertiser server 1a, the operation is similar to the operation of the specific example.

FIG. 12 is a diagram that illustrates an example of the configuration of a selection condition according to this embodiment. FIG. 13 is a diagram that illustrates an example of the configuration of a database of registration management information according to this embodiment. A registered communication apparatus notifies a broker of an attribute (attribute information) that is information representing the characteristics of a subscriber of the owner of the registered communication apparatus in a set with an identifier of the registered communication apparatus. A communication apparatus managing unit 23 of a broker server 2, as illustrated in FIG. 13, stores the identifier and the attribute, which have been received, in the database as one entry for each communication apparatus. The selection condition, as illustrated in FIG. 12, includes the number (number of requests) of distributors and the attribute (reference attribute information).

One attribute is configured by one or more tags. The tag may be any identifier or any character string as long as it is unique. The tag may be selected from a set of the list of usable identifiers or character strings agreed between an advertiser server 1 and the broker server 2 and the communication apparatus in advance.

Alternatively, the registered communication apparatus may generate a new tag. In addition, the number of tags configuring the attribute may be different for each communication apparatus. For example, as illustrated in FIG. 13, an attribute corresponding to a communication apparatus 3-1 is configured by two tags 200 and 201. In addition, an attribute corresponding to a communication apparatus 3-2 is configured by three tags 202, 203, and 204.

Examples of information represented by the content of the attribute include a taste of a subscriber, a category of a product or a service in which a subscriber is interested, and the like. This may be generated by the communication apparatus based on a behavior history of an owner of the communication apparatus. As the behavior history, for example, services used in the past or positional information acquired by a positioning system such as a GPS may be used. A method of generating a tag based on such a behavior history is arbitrary. Alternatively, it may be configured such that the communication apparatus does not generate the attribute, but a subscriber using the communication apparatus directly designates an attribute by operating an input unit of the communication apparatus.

The advertiser server 1 may designate an attribute as a selection condition. In the process according to the first embodiment illustrated in FIG. 7, the broker server 2 returns an identifier of a communication apparatus that has an attribute having a highest degree of similarity with an attribute included in a selection condition of an instruction received from the advertiser server 1 by referring to registration management information. In a case where there are communication apparatuses each having an attribute completely matching the attribute included in the selection condition, communication apparatuses corresponding to the number of apparatuses designated in the selection condition are selected from among the communication apparatuses as distributor apparatuses. On the other hand, in a case where there is no communication apparatus having an attribute completely matching the attribute included in the selection condition, communication apparatuses are sequentially selected in order of highest to lowest degree of similarity of attributes thereof as distributor apparatuses. Here, the degree of similarity between two attributes each configured by a plurality of tags is defined as the number of tags matching each other in both attributes among tags included in both the attributes.

For example, it is assumed that the number of tags configuring an attribute designated as the selection condition is two of a first tag and a second tag, and a tag matching the first tag and a tag matching the second tag are included in the attribute of communication apparatus #1. In addition, it is assumed that a tag matching the first tag is included in the attribute of communication apparatus #2, but a tag matching the second tag is not included therein. In such a case, the degree of similarity of communication apparatus #1 is "2", and the degree of similarity of communication apparatus #2 is "1".

By using the degree of similarity of the attribute, the broker server 2 can select a distributor that is appropriate for distributing a content of an advertiser. As a specific example, a distributor interested in automobiles has many chances for visiting an automotive exhibition hall, an automotive accessory shop, and the like, and it is considered that many subscribers interested in the automobiles are present in such places. Accordingly, in a case where an advertiser includes a tag relating to automobiles, a tag relating to automotive exhibition halls, and the like as selection conditions, there are many distributors visiting places relating to automobiles. In this way, there are many chances for the content to arrive at the subscribers interested in the automobiles.

As tags, information relating to places such as a geographical name and a facility name may be used. In such a case, as the tag of the registered communication apparatus, the name of a place that the registered communication apparatus frequently visits is designated. Meanwhile, the advertiser, as the selection condition, designates a geographical name considered to be appropriate for the distribution of the content thereof as a tag. For example, in a case where a content to be distributed is an advertisement of an automobile, the advertiser selects a geographical name such as an automotive accessory shop or an automobile exhibition as a tag. In addition, in a case where an advertiser wants to distribute a content to the vicinity of an area in which stores thereof are present, the stores may be designated as the tag. The broker server 2 selects registered communication apparatuses having tags such as the geographical names or the facility names designated by the advertiser as many as possible as a distributor apparatus.

As described above, in this embodiment, the attribute configured by one or more tags is included in the communication apparatus information, and the attribute configured by one or more tags is included as the selection condition. Then, the broker server 2 is configured to select distributors based on the degree of similarity between the attribute of the communication apparatus and the attribute included in the selection condition. In this way, the communication apparatuses close to the selection condition of an instruction from the advertiser can be selected as distributors with high priority, and accordingly, the content can be efficiently distributed.

Fourth Embodiment

Next, a method for selecting a distributor according to a fourth embodiment will be described. The configuration of a content distribution system according to this embodiment and the configuration of each apparatus configuring the content distribution system are similar to those of the first embodiment or the second embodiment.

Here, a specific example of the method for selecting a distributor of a case where the configuration example according to the first embodiment is employed will be described. However, also in a case where the configuration example according to the first embodiment is employed, while the subject of the selection is replaced with the advertiser server 1a, the operation is similar to the operation of the specific example.

In this embodiment, similarly to the third embodiment, an attribute configured by one or more tags is stored in a database as one entry of registration management information. In addition, similarly to the third embodiment, an attribute is included in a selection condition. In this embodiment, a weighted tag is used as the tag.

FIG. 14 is a diagram that illustrates an example of the data structure of weighted tags according to this embodiment. The attribute for each communication apparatus is managed by the same database configuration as that according to the second embodiment illustrated in FIG. 13. For each tag, based on the data structure illustrated in FIG. 14, a weight for each tag is managed. An arbitrary real number may be designated as the weighted value, and it may be a negative number. When the attribute is transmitted, the communication apparatus also transmits the weighted value of each tag to the broker server 2.

As the degree of similarity between attributes configured by weighted tags, each product of the weighted values of matching tags is calculated, and a value acquired by taking a sum thereof is set. For example, it is assumed that the number of tags configuring an attribute designated as the selection condition is two of a first tag and a second tag, and a tag matching the first tag and a tag matching the second tag are included in the attribute of communication apparatus #1. In the selection condition, the weighted value of the first tag is denoted by $wp_1$, and the weighted value of the second tag is denoted by $wp_2$. In addition, in the attribute of communication apparatus #1, the weighted value of the first tag is denoted by $ws_1$, and the weighed value of the second tag is denoted by $ws_2$. In such a case, the degree of similarity of communication apparatus #1 is $wp_1 \times ws_1 + wp_2 \times ws_2$. Here, while the weighted value is individually set in the selection condition and the attribute of the communication apparatus, the weighted value may be set in any one of the selection condition and the attribute of the communication apparatus.

By using the weighted tag, in the tag matching the selection condition, in a case where the weighted values of both the selection condition and the communication apparatus are large, the tag contributes much to the degree of similarity of the attribute. To the contrary, in the matching tag, in a case where both or one of the weighted values is small, the rate at which the tag contributes to the degree of similarity of the attribute is low.

An advantage of using the weighted tag is that a weight different for each tag can be assigned. For example, in a case where a subscriber is interested in a plurality of items, a case may be considered in which an item in which the subscriber is strongly interested and an item in which the subscriber is interested not that strongly are mixed among them. In addition, as categories used for representing the subject of the content by the advertiser, a category strongly representing the subject of the content and a category having relevance with the subject that is not that high are mixed. By weighting the tag using the weight, the degree of similarity between the attributes is high in a case where tags that are considered to be of significance by both the subscriber and the advertiser match each other. It is considered that, by selecting a distributor using the degree of similarity calculated as above, a content reaches an optimal subscriber, and the content hit rate tends to be improved.

Fifth Embodiment

Next, a method for selecting a distributor according to a fifth embodiment will be described. The configuration of a content distribution system according to this embodiment and the configuration of each apparatus configuring the content distribution system are similar to those of the first embodiment or the second embodiment.

Here, a specific example of the method for selecting a distributor of a case where the configuration example according to the first embodiment is employed will be described. However, also in a case where the configuration example according to the first embodiment is employed, while the subject of the selection is replaced with the advertiser server $1a$, the operation is similar to the operation of the specific example.

In this embodiment, similarly to the third embodiment, an attribute configured by one or more tags is stored in a database as one entry of registration management information. In this embodiment, an extended tag configured by one main tag and zero or more sub tags is used as the tag. In addition, similarly to the third embodiment, an attribute is included in a selection condition.

Figure 15:
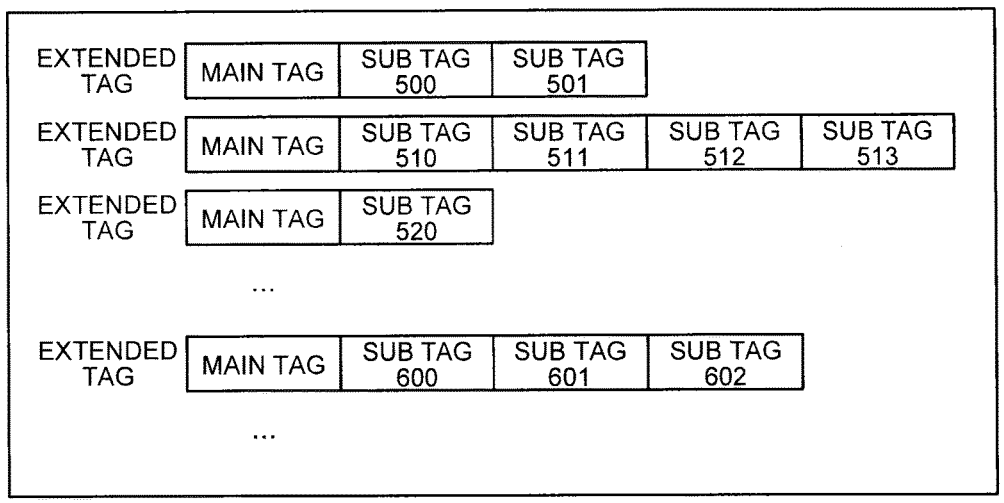
FIG. 15 is a diagram that illustrates an example of the data structure of extended tags according to a fifth embodiment.

FIG. 15 is a diagram that illustrates an example of the data structure of extended tags according to this embodiment. The attribute for each communication apparatus is managed based on the same database configuration as that according to the second embodiment illustrated in FIG. 13. As illustrated in FIG. 15, a main tag and a sub tag of each tag (extended tag) are managed. Similarly, the selection condition includes an attribute that is configured by an extended tag. When the attribute is transmitted, the communication apparatus also transmits the main tag and the sub tag configuring each extended tag to the broker server 2.

As the degree of similarity between attributes configured by the extended tags, the numbers of matching sub tags between extended tags having main tags matching each other are calculated, and a value acquired by taking the sum thereof is set. Thus, extended tags of which the main tags match each other and many sub tags match each other contribute much to the calculation of the degree of similarity between attributes. On the other hand, extended tags of which the main tags match each other but sub tags do not match each other at all do not contribute to the calculation of the degree of similarity between attributes.

For example, in the selection condition, it is assumed that the first tag is configured by a first main tag and a first sub tag, and the second tag is configured by a second main tag, a second sub tag, and a third sub tag. In the attribute of communication apparatus #1, it is assumed that extended tags of which main tags match each other together with the first tag and the second tag are present. In addition, in the attribute of communication apparatus #1, it is assumed that the sub tag of the extended tag of which the main tag matches the first tag does not match the selection condition, and the sub tag of the extended tag of which the main tag matches the second tag matches the second sub tag of the selection condition. In such a case, the degree of similarity of communication apparatus #1 is "3" which is acquired by adding "2" according to the matching of the main tag and "1" according to the matching of the second sub tag.

By using the extended tag, the degree of matching can be evaluated using a plurality of discrete values instead of two kinds including complete matching between tags and no-matching between tags. For example, in a case where an interesting product or service is represented using the extended tag in the attribute of the registered communication apparatus, a large category of an interesting product or service is designated in the main tag, and a fine category of the product or service is designated in the sub tag. In a case where the main tag is an automobile, auxiliary symbols relating to the automobile such as an automobile type, optional equipment, and a color may be designated in the sub tag. Also in a case where the extended tag is used for the attribute designated in a broker by the advertiser, a category that schematically defines a content may be set in the main tag, and a category defining a fine part may be set in a sub tag. In this way, in consideration of the degree of similarity up to a fine category part, the broker can select a communication apparatus that is appropriate for the distribution of a content of the advertiser as a distributor.

As another example using the extended tag, information of a place such as a geographical name or a facility name is designated in the main tag, and the day is designated in the sub tag. Such an extended tag represents a place that is frequently visited by a registered communication apparatus and the day on which the place is visited for the registered communication apparatus and represents a place at which the content is desired to be distributed and the day on which the content is desired to be distributed for the advertiser. By calculating the degree of similarity between such extended tags, for an advertiser desiring to distribute a certain content at a certain place on a certain day, a distributor having a high possibility of visiting the place on the designated certain day can be selected.

Sixth Embodiment

Next, a method for selecting a distributor according to a sixth embodiment will be described. The configuration of a content distribution system according to this embodiment and the configuration of each apparatus configuring the content distribution system are similar to those of the first embodiment or the second embodiment.

Here, a specific example of the method for selecting a distributor of a case where the configuration example according to the first embodiment is employed will be described. However, also in a case where the configuration example according to the first embodiment is employed, while the subject of the selection is replaced with the advertiser server $1a$, the operation is similar to the operation of the specific example.

In this embodiment, similarly to the third embodiment, an attribute of the communication apparatus is stored in a database as one entry of registration management information. In this embodiment, as the attribute, coordinate information representing the position of the communication apparatus is used. The communication apparatus notifies the broker server 2 of the coordinate information of the position that the subscriber owning the communication apparatus frequently visits as the attribute. Here, as the coordinate information, latitude and longitude are used. In the case of staying at the same place for a predetermined time or more, the communication apparatus stores the latitude and the longitude of the place based on the positioning information of the GPS or the like. Then, the communication apparatus notifies the broker server 2 of the latitude and the longitude as the attribute. In addition, the subscriber may directly set the latitude and the longitude of a place that is frequently visited in the communication apparatus by operating the input unit of the communication apparatus.

Figure 16:
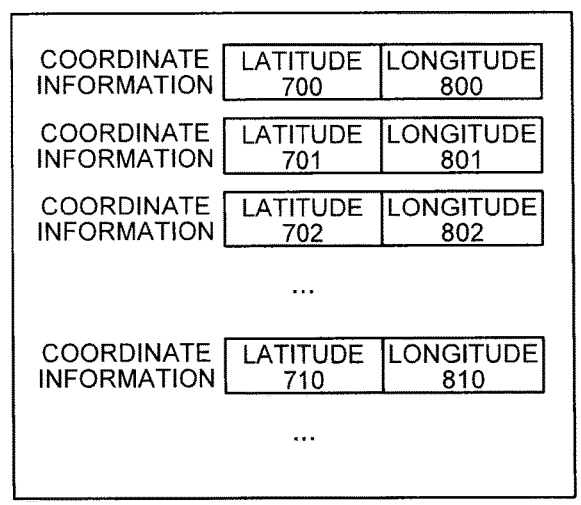
FIG. 16 is a diagram that illustrates an example of the data structure of coordinate information according to a sixth embodiment.

FIG. 16 is a diagram that illustrates an example of the data structure of the coordinate information according to this embodiment. The attribute of each communication apparatus is managed based on the same database configuration as that according to the second embodiment as illustrated in FIG. 13. As the data structure of the coordinate information that is a tag configuring an attribute, the structure as illustrated in FIG. 16 is employed. The attribute of each communication apparatus includes one or more pieces of coordinate information.

The advertiser includes the attribute that is configured by the coordinate information of a place at which a content is desired to be distributed in the selection condition. The attribute included in the selection condition includes one or more piece of coordinate information. Then, the broker server 2 compares the attribute of the selection condition with the attribute of the communication apparatus and selects communication apparatuses as distributors in order of smallest to largest degree of a difference therebetween.

In this embodiment, the degree of a difference between the coordinate information of the selection condition and the coordinate information of the communication apparatus is defined as follows. The attribute of the selection condition is set as a first attribute, and the attribute of the communication apparatus is set as a second attribute. At this time, coordinate information having a shortest distance from each piece of coordinate information included in the first attribute is selected from among the second attribute information. Then, a sum of distances between each coordinate information of the first attribute and the coordinate information of the second attribute having a shortest distance from the each coordinate information is set as the degree of a difference between the first attribute and the second attribute.

More specifically, for example, the degree of a difference is calculated as follows. The number of pieces of coordinate information included in the selection condition, in other words, the number of places to which the content is distributed by the advertiser is set as N. The i-th piece of the coordinate information included in the selection condition is denoted by $(xp_i, yp_i)$. In addition, the number of pieces of coordinate information included in the attribute of the communication apparatus is denoted by M. Here, coordinate information included in the attribute of the communication apparatus that has a shortest distance from $(xp_i, yp_i)$ is denoted by $(xs_i, ys_i)$. At this time, the degree of a difference is calculated using the following Equation (1). Here, Σ represented below is a sum of i=1 to i=M.

$$\text{Degree of Difference} = \Sigma\{(xp_i - xs_i)^2 + (yp_i - ys_i)^2\}^{1/2} \quad (1)$$

Figures 17, 18:
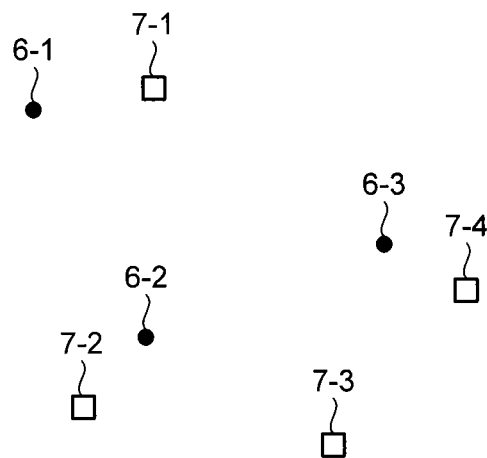
FIG. 17 is a diagram that illustrates an example of coordinate information of a selection condition and coordination information of a communication apparatus.
FIG. 18 is a diagram that illustrates an example of the data structure of coordinate information according to a seventh embodiment.

FIG. 17 is a diagram that illustrates an example of the coordinate information of the selection condition and the coordination information of the communication apparatus. As illustrated in FIG. 17, the coordinate information included in the attribute of the selection condition is represented as coordinate information 6-1, coordinate information 6-2, and coordinate information 6-3, and the coordinate information included in the attribute of the communication apparatus is represented as coordinate information 7-1, coordinate information 7-2, coordinate information 7-3, and coordinate information 7-4. Among the coordinate information 7-1, the coordinate information 7-2, the coordinate information 7-3, and the coordinate information 7-4, the coordinate information of a position closest to the coordinate information 6-1 is the coordinate information 7-1, the coordinate information of a position farthest from the coordinate information 6-2 is the coordinate information 7-2, and the coordinate information of a position farthest from the coordinate information 6-3 is the coordinate information 7-4. In this case, the degree of a difference is a sum of a distance between the coordinate information 6-1 and the coordinate information 7-1, a distance between the coordinate information 6-2 and the coordinate information 7-2, and a distance between the coordinate information 6-3 and the coordinate information 7-4.

In this way, since a distance between the coordinate information of the selection condition used as the reference and the coordinate information having a shortest distance therefrom among the coordinate information of the communication apparatus is acquired, even in a case where there is a difference between the numbers of pieces of coordinate information included in the attribute of the selection information and the attribute of the communication apparatus, the degree of a difference can be appropriately acquired. Here, the above-described method of calculating the degree of a difference is an example, and the embodiment is not limited to the example described above as long as a communication apparatus having an attribute closest to the attribute of the selection condition can be selected based on the degree of a difference.

As described in the third embodiment, by using the name of a place as the tag, the place can be included in the selection criteria of a distributor. In contrast to this, according to this embodiment, a place is represented using numbers as coordinates, and accordingly, there is an advantage that the proximity of the place can be evaluated as a continuous value and be reflected on the calculation of the degree of a difference. Accordingly, the degree of similarity and the degree of a difference between attributes can be evaluated using a more detailed system. Therefore, a more appropriate distributor can be selected for a content distributed by the advertiser.

Seventh Embodiment

Next, a method for selecting a distributor according to a seventh embodiment will be described. The configuration of a content distribution system according to this embodiment and the configuration of each apparatus configuring the content distribution system are similar to those of the first embodiment or the second embodiment.

Here, a specific example of the method for selecting a distributor of a case where the configuration example according to the first embodiment is employed will be described. However, also in a case where the configuration example according to the first embodiment is employed, while the subject of the selection is replaced with the advertiser server 1*a*, the operation is similar to the operation of the specific example.

In this embodiment, similarly to the third embodiment, an attribute of the communication apparatus is stored in a database as one entry of registration management information. In this embodiment, similarly to the sixth embodiment, as the attribute, coordinate information representing the position of the communication apparatus is used, and weighted coordinate information is used as the coordinate information. A method of calculating the coordinate information is similar to that according to the sixth embodiment. A selection condition also includes an attribute configured by weighted coordinate information. Similarly to the fourth embodiment, the weighted value can be individually set in the attribute of the communication apparatus and the attribute of the selection condition. Alternatively, only a weighted value of one of the attribute of the communication apparatus and the attribute of the selection condition may be set.

FIG. 18 is a diagram that illustrates an example of the data structure of the coordinate information according to this embodiment. The attribute of each communication apparatus is managed based on the same database configuration as that according to the second embodiment as illustrated in FIG. 13. As the data structure of the coordinate information that is a tag configuring an attribute, the structure as illustrated in FIG. 18 is employed. The attribute of each communication apparatus includes one or more pieces of coordinate information.

When the degree of a difference between attributes configured by weighted coordinate information is calculated, first, as in the sixth embodiment, coordinate information having a shortest distance from each coordinate information included in the first attribute is selected from among the second attributes. Then, a value acquired by dividing a distance between the coordinate information of the first attribute and the coordinate information of the second attribute having a shortest distance from the coordinate information of the first attribute by a product of the weighted values thereof is set as a weighted distance. Then, a sum of the weighted distances is set as the degree of a difference between the first attribute and the second attribute.

The advantage of using the weighted value is, similar to that of the fourth embodiment, that a difference can be provided in the weight of each coordinate information. For example, in the case of the attribute of a communication apparatus, as the subscriber owning the communication apparatus visits a place more frequently, the weighted value may be considered to be increased. On the other hand, in the case of the attribute of the selection condition, as the advertiser desires to distribute a content to a place more strongly, the weighted value is set to a larger value. In this way, distributors can be appropriately selected.

Eighth Embodiment

Next, a method for selecting a distributor according to an eighth embodiment will be described. The configuration of a content distribution system according to this embodiment and the configuration of each apparatus configuring the content distribution system are similar to those of the first embodiment or the second embodiment.

Here, a specific example of the method for selecting a distributor of a case where the configuration example according to the first embodiment is employed will be described. However, also in a case where the configuration example according to the first embodiment is employed, while the subject of the selection is replaced with the advertiser server 1a, the operation is similar to the operation of the specific example.

In this embodiment, similarly to the third embodiment, an attribute of the communication apparatus is stored in a database as one entry of registration management information. In this embodiment, similarly to the sixth embodiment, as the attribute, coordinate information representing the position of the communication apparatus is used, the coordinate information is handled as a main tag, and zero or more sub tags are set for each main tag. A method of calculating the coordinate information is similar to that according to the sixth embodiment. A selection condition also includes an attribute configured by coordinate information that includes the sub tags. Similarly to the fourth embodiment, the weighted value can be individually set in the attribute of the communication apparatus and the attribute of the selection condition. Alternatively, only any one of weights of the attribute of the communication apparatus and the attribute of the selection condition may be set.

FIG. 19 is a diagram that illustrates an example of the data structure of the coordinate information according to this embodiment. In order to calculate the degree of a difference between attributes configured by the coordinate information including sub tags, first, as in the sixth embodiment, coordinate information having a shortest distance from each coordinate information included in the first attribute is selected from among the second attributes. Then, sub tags of the coordinate information of the first attribute and sub tags of the coordinate information of the second attribute having a shortest distance from the coordinate information of the first attribute are compared with each other, and the number C of sub tags matching each other is counted. In addition, a distance between the coordinate information of the first attribute and the coordinate information of the second attribute having a shortest distance from the coordinate information of the first attribute is calculated. Then, the calculated distance is divided by a value acquired by adding a positive constant A to the number C, and a result of this calculation is set as a normalized distance. Then, a sum of the normalized distances is set as the degree of a difference between attributes. Here, the adding of the positive constant A to the number C of matching sub tags is performed for preventing the occurrence of "division by zero" in a case where there is no matching sub tag.

An advantage of using the sub tags is that the number of matching sub tags can be taken into consideration in addition to the distance of the coordinate information when the degree of a difference between attributes is evaluated. For example, in the attribute of the communication apparatus, in coordinate information of a place that the subscriber owning the communication apparatus frequently visits, the day on which the place is visited is designated as the sub tag. On the other hand, in the attribute of the selection condition, coordinate information of a place to which the advertiser desires to distribute a content and the day on which the content is desired to be distributed are designated. In this way, distributors can be appropriately selected.

As above, in the third to eighth embodiments, as the attributes of the communication apparatus and the selection condition, six kinds including the tag, a set of the main tag and the sub tag, the weighted tag, the coordinate information, the weighted coordinate information, and the sub tag-attached coordinate information have been described. Each of the attributes of the communication apparatus and the selection condition may be a combination of two or more of the six kinds.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data processor comprising:
a memory;
a processor that acquires attribute information of communication apparatuses from a plurality of the communication apparatuses and stores identifiers of the plurality of communication apparatuses and the attribute information in the memory in association with each other as communication apparatus information; and
a selector that selects at least one distributor apparatus from the plurality of the communication apparatuses based on the communication apparatus information, the distributor apparatus distributing at least one content as at least one radio signal, wherein
the attribute information includes coordinate information, and
wherein the selector acquires a distance between a first coordinate information and a second coordinate information, the first coordinate information included in attribute information of a selection condition used for selecting the distributor apparatus, the second coordinate information being the coordinate information that is closest to the first coordinate information among the coordinate information included in the attribute information of each of the communication apparatuses,
acquires a degree of difference based on the distance, a weighted value of the first coordinate information and a weighted value of the second coordinate information, and
sequentially selects the communication apparatuses in order of lowest to highest degree of difference as the distributor apparatus.

2. The data processor according to claim 1, wherein, in a case where a registration request transmitted from the communication apparatus is received, the processor stores the identifier of the communication apparatus that is a transmission source of the registration request and the attribute information in the memory in association with each other as the communication apparatus information.

3. The data processor according to claim 1,
wherein the selection condition is stored in the memory.

4. The data processor according to claim 3, wherein the attribute information is configured by one or more tags.

5. The data processor according to claim 3, wherein the attribute information is configured by one or more extended tags, and the extended tag is configured by a main tag and zero or more sub tags corresponding to the main tag.

6. The data processor according to claim 1, wherein the coordinate information is configured by longitude and latitude.

7. The data processor according to claim 1,
wherein the selector acquires a product of the weighted value of the first coordinate information and the weighted value of the second coordinate information, and acquires the degree of difference based on the distance and the product.

8. The data processor according to claim 7,
wherein the selector acquires a sum of values each acquired by dividing the distance by the product as the degree of difference.

9. The data processor according to claim 8,
wherein the coordinate information is associated, with zero or more sub tags corresponding to the coordinate information, and
wherein the selector acquires the number of matching sub tags between the sub tags of the first coordinate information and the sub tags of the second coordinate information, acquires a degree of difference based on the distance and the number of the matching sub tags, and sequentially selects the communication apparatuses in order of lowest to highest degree of difference as the distributor apparatus.

10. The data processor according to claim 9,
wherein the selector acquires a sum of values each acquired by dividing a value acquired by adding a positive constant to the number of the matching sub tags by the distance as the degree of difference.

11. The data processor according to claim 1, wherein the coordinate information of the communication apparatus is coordinate information representing a position at which the communication apparatus stays for a predetermined time or more.

12. The data processor according to claim 5, wherein the main tag indicates information of a place, and the sub tag indicates a day.

13. A content distribution system comprising:
at least one first apparatus;
at least one second apparatus; and
a plurality of communication apparatuses,
the first apparatus including:
a content generator that generates at least one content;
a selection condition generator that, generates a selection condition used for selecting at least one distributor apparatus from the plurality of communication apparatuses, the distributor apparatus distributing at least one content as at least one radio signal; and
a communication interface that transmits the content and the selection condition to the second apparatus, and
the second apparatus including:
a memory;
a processor that acquires attribute information of the communication apparatuses from a plurality of the communication apparatuses and stores identifiers of the plurality of communication apparatuses and the attribute information in the memory in association with each other as communication apparatus information; and
a selector that selects the at least one distributor apparatus from plurality of the communication apparatuses based on the communication apparatus information and the selection condition received from the first apparatus,
the processor transmitting the content to the distributor apparatus, wherein
the attribute information includes coordinate information, and
wherein the selector acquires a distance between a first coordinate information and a second coordinate information, the first coordinate information included in attribute information of the selection condition, the second coordinate information being the coordinate information that is closest to the first coordinate information among the coordinate information included in the attribute information of each of the communication apparatuses,
acquires a degree of difference based on the distance, a weighted value of the first coordinate information and a weighted value of the second coordinate information, and sequentially selects the communication apparatuses in order of lowest to highest degree of difference as the distributor apparatus.

14. A content distribution system comprising:
at least one first apparatus;
at least one second apparatus; and
a plurality of communication apparatuses,
the first apparatus including:
a content generator that generates at least one content;
a selection condition generator that generates a selection condition used for selecting at least one distributor apparatus from the plurality of communication apparatuses, the distributor apparatus distributing at least one content as at least one radio signal; and
a communication interface that transmits the selection condition to the second apparatus, and
the second apparatus including:
a memory;
a processor that acquires attribute information of the communication apparatuses from the plurality of the communication apparatuses and stores identifiers of the plurality of the communication apparatuses and the attribute information in the memory in association with each other as communication apparatus information; and
a selector that selects the at least one distributor apparatus from the plurality of communication apparatuses based on the communication apparatus information and the selection condition received from the first apparatus,
the second apparatus notifying the first apparatus of the selected the at least one distributor apparatus,
the first apparatus transmitting the content to the distributor apparatus, wherein
the attribute info ration includes coordinate information, and
wherein the selector acquires a distance between a first coordinate information and a second coordinate information, the first coordinate information included in attribute information of the selection condition, the second coordinate information being the coordinate information that is closest to the first coordinate information among the coordinate information included in the attribute information of each of the communication apparatuses,
acquires a degree of difference based on the distance, a weighted value of the first coordinate information and a weighted value of the second coordinate information, and
sequentially selects the communication apparatuses in order of lowest to highest degree of difference as the distributor apparatus.

* * * * *